United States Patent [19]
Leonard

[11] Patent Number: 5,729,746
[45] Date of Patent: Mar. 17, 1998

[54] COMPUTERIZED INTERACTIVE TOOL FOR DEVELOPING A SOFTWARE PRODUCT THAT PROVIDES CONVERGENT METRICS FOR ESTIMATING THE FINAL SIZE OF THE PRODUCT THROUGHOUT THE DEVELOPMENT PROCESS USING THE LIFE-CYCLE MODEL

[76] Inventor: Ricky Jack Leonard, 1076 Sandy Springs Rd., Huntsville, Ala. 35806

[21] Appl. No.: 551,939

[22] Filed: Oct. 23, 1995

Related U.S. Application Data

[63] Continuation-in-part of Ser. No. 443,391, May 17, 1995, abandoned, which is a continuation of Ser. No. 987,712, Dec. 8, 1992, abandoned.

[51] Int. Cl.$^6$ ............................................. G06F 9/455
[52] U.S. Cl. ............................................. 395/701; 364/286
[58] Field of Search ............................ 364/286; 395/701, 395/703, 702, 710

[56] References Cited

U.S. PATENT DOCUMENTS

| | | | |
|---|---|---|---|
| 5,123,103 | 6/1992 | Ohtaki et al. | 395/600 |
| 5,191,646 | 3/1993 | Naito et al. | 395/161 |
| 5,321,610 | 6/1994 | Breslin | 395/419.19 |
| 5,361,360 | 11/1994 | Ishigami et al. | 395/700 |
| 5,493,682 | 2/1996 | Tyra et al. | 395/700 |
| 5,587,935 | 12/1996 | Brooks et al. | 364/578 |

OTHER PUBLICATIONS

Leonard, R. "A Convergent Model For Predicting Software Programming Effort", May 1991.

T. DeMarco, Controlling Software Projects: Management Measurement and Estimation (New York: Yourdon Press, 1982), pp. 49–55.

S. Conte, and V. Shen, Software Engineering Metrics and Models (Menlo Park, California: Benjamin/Cummings, 1986), pp. vii, 172,173, 176, 3, 4, 6, 7, 15, 19, 20, 35, 37, 41, 42, 48, 50, 216, 249, 250, 251.

R. Jenson and C. Tanies, Software Engineering (Englewood Cliffs, New Jersey: Prentioe–Hall, 1979), pp. 1–2, 22.

Andrew Shenz–Yen Wang, The Estimation of Software Size and Effort: An Approach Based on the *Evolution of Software Metrics* (Ph.D. Thesis, Department of Computer Science, Purdue University, Aug. 1984), pp. 74, 75, 77, 78.

B. Londeix, Cost Estimation For Software Development (Massachusetts: Addison–Wesley, 1987) p. 42–43.

Barry Boehm, *Software Engineering Economics* (Englewood Cliffs, New Jersey: Prentice–Hall, 1981), pp. 36–38, 316–323, 338, 340, 591.

Meilir Page–Jones, *The Practical Guide to Structured Systems Design* (New York: Yourdon Press, 1980), pp. 3, 4, 51, 52, 57–61, 63, 65, 67, 78, 79, 80, 86, 181, 317, 182–199, 74, 75, 316, 202, 203.

T. DeMarco, *Structured Analysis and System Specification* (New York: Yourdon Press, 1978), pp. 203, 318, 314, 317.

J.F. Peters, III and Hamed M. Sullam, "Compleat C" (1986), pp. 17–20.

D.M. Etter, "Problem Solving In Pascal For Engineers and Scientists" (1988), pp. 44–51, 56–61, 7–, 71.

Huffman and Burgess, Partially Automated In–Line Documentation (PAT1): "Design and Implementation of a Software Maintenance Tool" (1988) IEEE.

Frederick P. Brooks, Jr., "The Mythical Man–Month" (1982), pp. 97–103.

*Primary Examiner*—Alvin E. Oberley
*Assistant Examiner*—Michael T. Richey
*Attorney, Agent, or Firm*—Shlesinger Arkwright & Garvey LLP

[57] ABSTRACT

A computerized interactive tool for developing a software product that provides estimates of the final lines of code of the software product at several points during the software development process to properly allocate programming effort resources. The estimates converge with actual results as the software development process progresses from one phase to the next.

10 Claims, 12 Drawing Sheets

OTHER PUBLICATIONS

Graham C. Low et al., "Function Points in the Estimation and Evaluation of the Software Process", (1990) IEEE, pp. 64–71.

Ware Myers, "Allow Plenty of Time for Large–Scale Software" (1989) IEEE, pp. 92–99.

Luiz A. Laranjeira, "Software Size Estimation of Object–Oriented Systems" (1990), IEEE, pp. 510–522.

Donna K. Cover, "Issues Affecting the Reliability of Software–Cost Estimates (Trying to Make Chicken Salad Out of Chicken Feathers)" (1988), IEEE, pp. 195–201.

FIG. 1
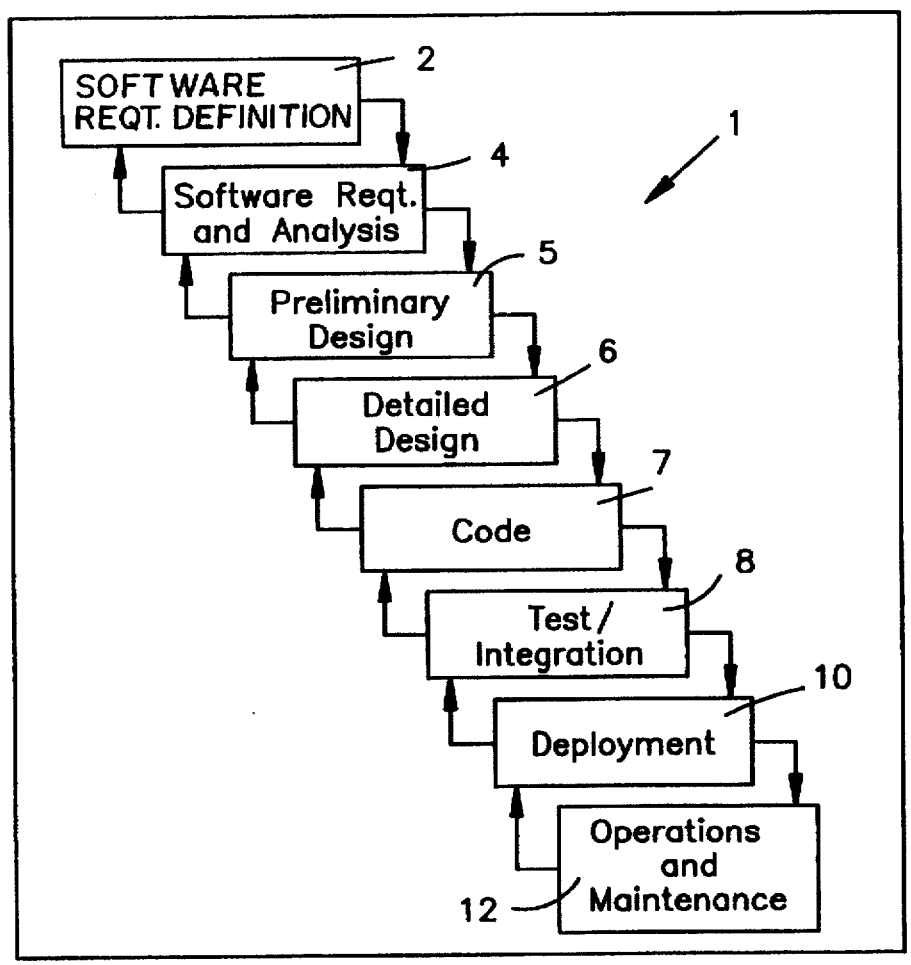
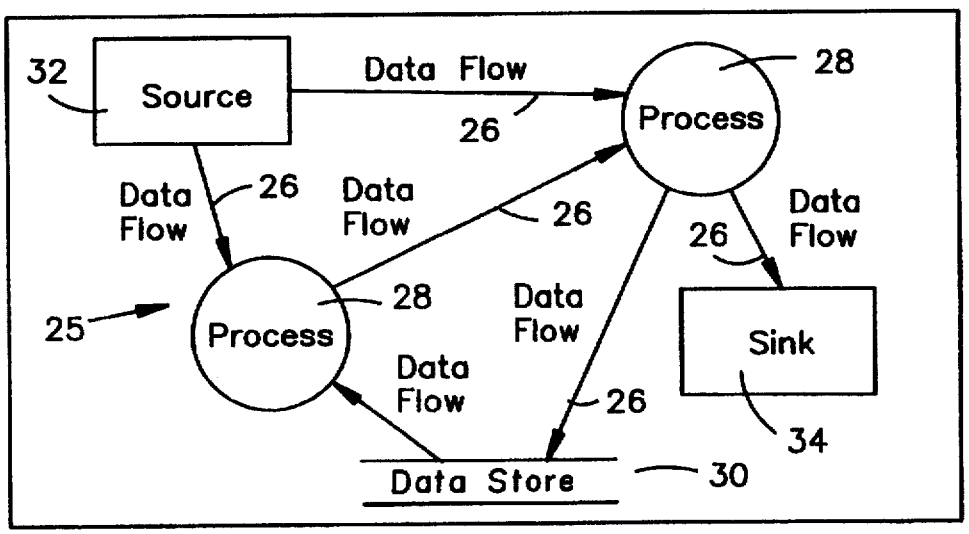
FIG. 3

FIG. 7

| FIRE CONTROL SYSTEM |
|---|
| 5.4.3.    1.0 Select target.<br>           2.0 If target is moving ,<br>               2.1 Get target speed.<br>               2.2 Get target path.<br>           3.0 Get target distance.<br>           4.0 Fire weapon. |

```
Subroutine Fire_Con_Sys(target, X_coord, Y_coord)
Integer X_coord, Y_coord, target
Real    speed
Logical Moving, valid
Call Sel_target(target, moving)
If ((target.ge.1) .and. (target.1e.5)) Then
    valid = true
Else
    valid = false
End If
If (valid.eq.true) Then
    If (moving.eq.true) Then
        Call Get_Tar_Speed(target, speed)
        Call Get_Predicted_Path(target, X_coord,
              Y_coord, speed)
    Else
        Call Get_target(target, X_coord, Y_coord)
    End If
    Fire_Round(target, X_coord, Y_coord)
End If
End
```

FIG. 11

FIG. 8
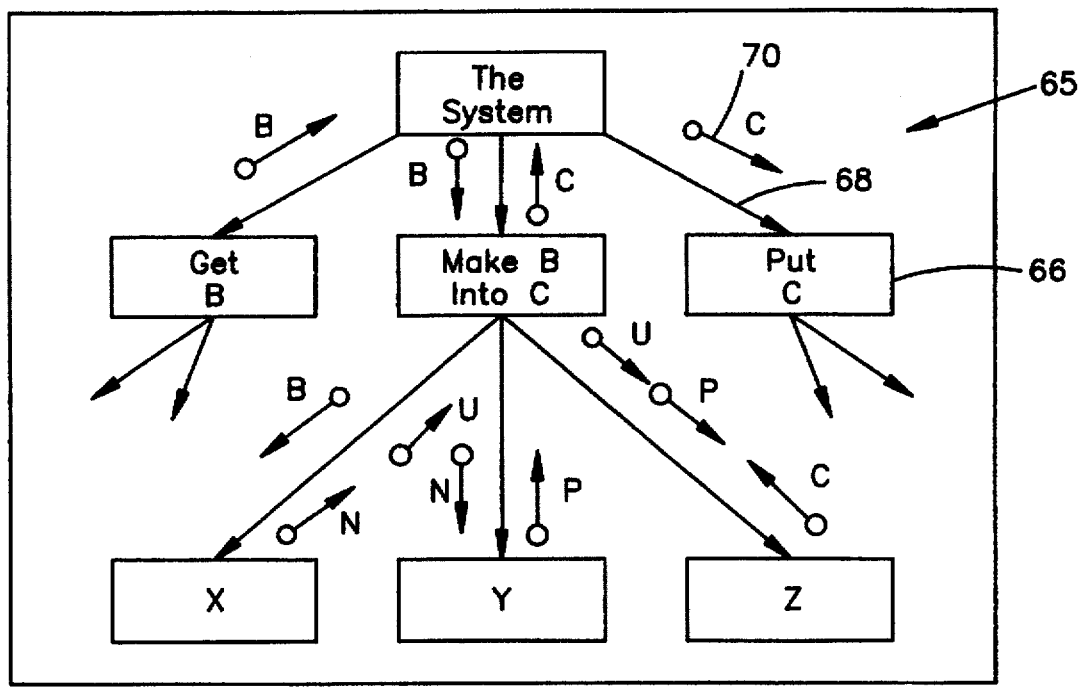
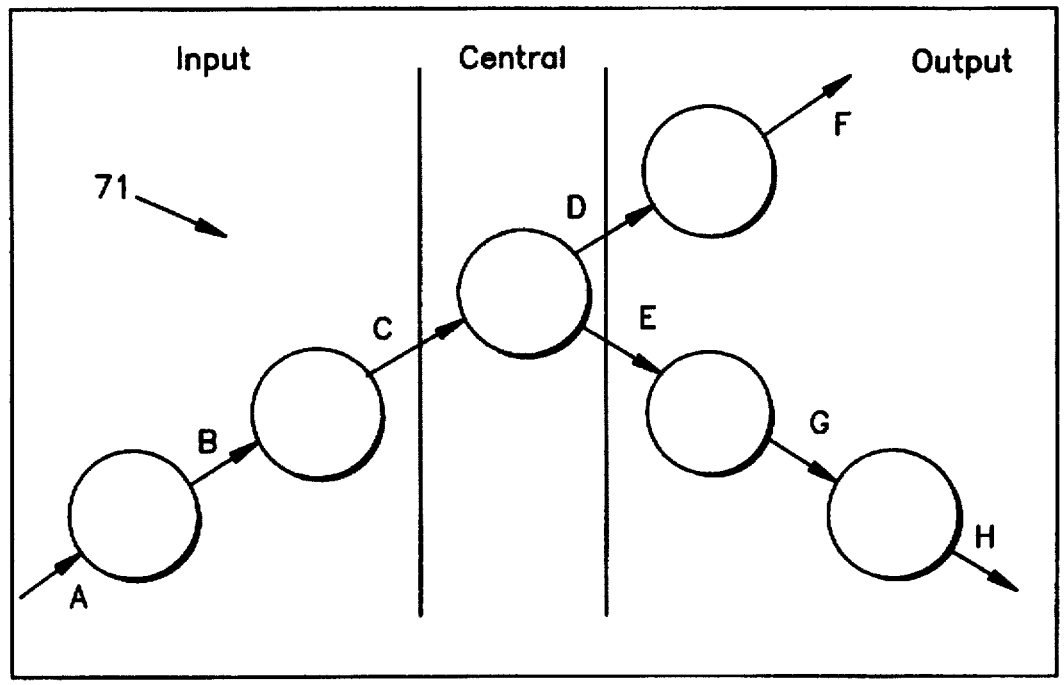
FIG. 9

5,729,746

COMPUTERIZED INTERACTIVE TOOL FOR DEVELOPING A SOFTWARE PRODUCT THAT PROVIDES CONVERGENT METRICS FOR ESTIMATING THE FINAL SIZE OF THE PRODUCT THROUGHOUT THE DEVELOPMENT PROCESS USING THE LIFE-CYCLE MODEL

RELATED APPLICATIONS

This is a continuation-in-part of application Ser. No. 08/443,391, filed May 17, 1995, now abandoned which is a continuation of application Ser. No. 07/987,712, filed Dec. 8, 1992, now abandoned.

FIELD OF THE INVENTION

The present invention relates generally to a computerized interactive engineering tool for developing a software product and particularly to a software product development tool that provides convergent estimates of the final lines of code of the software product during the early phases and through the later stages of the software development process using the life-cycle model.

BACKGROUND OF THE INVENTION

Techniques for objectively estimating the size of a software product during the early stages of the software development process are practically non-existent. Generally, this task has been consigned to the experienced software professional whose collective estimation methods are limited to his or her own personal judgements or intuition. Hopefully, these estimates converged with actual results as the software development process advanced from one phase to the next.

The application of a disciplined, convergent approach to the software development process has been hampered by the perception of the software industry as impervious to the design and management techniques of more rigorous approaches. This has caused software development to be viewed more as an art than a discipline, with increasing costs, project delays, and poor reliability being accepted as the norm.

Due to the lack of a disciplined approach software, life-cycle costs have increased dramatically, both in absolute terms and as a percentage of the total hardware/software budget. Thirty years ago software life-cycle costs comprised less than 20% of the hardware/software budget. Currently, 80% of the hardware/software budget is devoted to the software life-cycle, while 60% of the software life-cycle budget is devoted solely to maintenance. It is interesting to note that the cost of maintaining a software project exceeds the cost of developing the original software product. This is one of the first indications that problems exist with the way software developers ply their trade. To overcome these problems, and to allow the field of software development to grow into a reliable profession, these costs must be managed and controlled by a disciplined approach to the software development process.

Current research on the software development process has focused on the analysis and design of more reliable methods of producing a software product. This has resulted in the application of more rigorous disciplines, such as systems engineering, to the problems of software development. Two techniques used for process analysis within the discipline of systems engineering are life-cycle models and metrics.

A life-cycle model partitions the processes required for the development of a product. In addition, it provides the engineer with a framework that can be used for evaluating the impact of alternative solutions to the specific problems encountered as the product is being developed. The building of this framework should take the developer from the conception of the project through its phaseout.

As part of this evaluation process, metrics are used as a quantitative measurement of the effort and cost of the problem solution within the framework of the model. Once the appropriate metrics are established within this framework, they may be used during the earlier phases of the project life-cycle for predicting the effort and cost of the product developed. Although the efforts of metric identification within the software development process are not entirely conclusive, current studies indicate that program size is very closely associated with the amount of labor required to accomplish the software task and, subsequently, the overall cost of the software product.

OBJECTS AND SUMMARY OF THE INVENTION

It is an object of the present invention to provide a computerized interactive engineering tool for developing software product that provides estimates of the product final size at early phases of the life-cycle process.

It is another object of the present invention to provide a computerized tool that provides a set of predictor metrics for the software product final size that converge with actual results during the software product development process.

It is still another object of the present invention to provide a software product development model and development tools or techniques that enhance the definition and/or refinement of the predictor metric set for estimating the final size of the software product being developed.

It is another object of the present invention to provide a computerized engineering tool for developing software product that provides estimates of the final size of the software product at early phases of the software life-cycle that converge with actual results, thereby providing relatively accurate allocation of resources for the project.

In summary, the present invention provides a computerized interactive tool for developing software product using predictor metrics that are used to determine the software product final size at different stages in the product development process, thereby providing for better management of the software project.

These and other objects of the present invention will become apparent from the following detailed description.

BRIEF DESCRIPTIONS OF THE DRAWINGS

FIG. 1 is a chart of a software life-cycle process.

FIG. 3 is an exemplary data flow diagram showing its various components.

FIG. 7 is an exemplary mini-spec.

FIG. 8 is an exemplary structure chart.

FIG. 9 is another exemplary data flow diagram.

FIG. 11 is a structure chart descriptions of the mini-spec of FIG. 7.

DETAILED DESCRIPTION OF THE INVENTION

PREDICTOR METRICS

Figure 2:
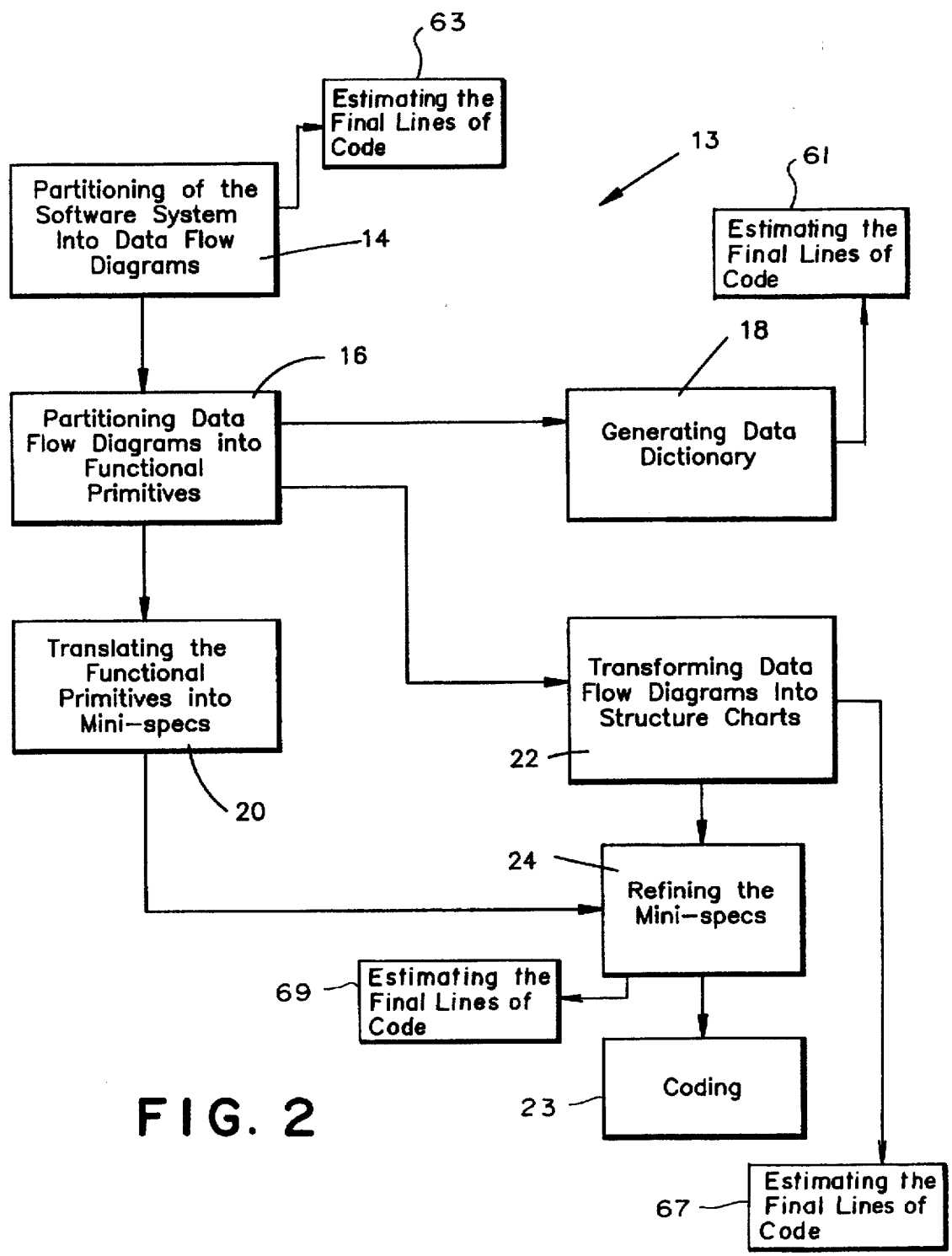
FIG. 2 is a flowchart of structured analysis and design in accordance with the present invention.

Software metrics are defined as the measurable indication of some quantitative aspect of a software system. The quantitative aspects of a software system that most require metrics include, but are not limited to, size, effort, time, cost, risk, and man-power. For these metrics to be considered useful, they should be scaled uniformly; converge with actual results as estimates are refined during the project life-cycle phases; and eventually, be resolvable with observed fact.

A useful metric is distinguished by measurability (by definition, an indicator must be measurable in order to be considered a metric), independence (employees working on a project should not be able to influence the outcome of the metric), accountability (an audit trail should be established for all of the data collected to insure the integrity of the data and the provability of the metric), and precision (intuitively, some metrics are more precise than others so that the precision of each metric should be recorded as a part of the characteristics of that metric).

Software metrics may be categorized as either process metrics or product metrics. Process metrics are used to measure the characteristics of the development process and the development environment, while product metrics are used to measure the characteristics of the software product developed.

Examples of process metrics include resource metrics and personnel experience metrics. Resource metrics may include effort in terms of man-power, computer size, and development cost. Personnel experience metrics may include the number of years that an organization has been using a particular programming language and the number of years of experience that a programmer has on similar projects. Other factors include the use of structured programming techniques, the use of programming tools, the management techniques employed by the organization, and resource availability.

Examples of product metrics include the size of the program, the productivity of the programmers, the complexity of the program logic, and the complexity of the data structures. Various combinations of these are also considered as product metrics.

A metric that has a strong correlation to some later result is known as a predictor metric. When the early stages of the software product life-cycle are considered, the specification phase, as will be discussed below, provides the earliest source of predictor metrics, while the design phase, as will be discussed below, produces predictor metrics that are useful in refining estimates made during the specification phase. If the product has been designed and implemented properly, these results should converge with the actual results encountered during the implementation phase.

A consistent measure of program size is the number of lines of code metric (LOC), where LOC=S, where S is the size of the software system. To provide consistency in the measurement, blank lines and comments are not counted. Since some lines of code have more tokens than others, a more consistent metric of program size ($LOC_n$) is determined by dividing the number of tokens in a program by the average number of tokens per line.

Once the size of the system has been determined, estimates can be made using productivity metrics concerning the amount of effort required to develop the system and, subsequently, the amount of time required to complete the system. From these measurements, other metrics (such as cost and risk) may be determined.

A line of code is defined as any line of program text that is not a comment or a blank line, regardless of the number of statements or fragments on the line. This specifically includes all lines containing program headers, declarations, and executable and non-executable statements.

This definition of lines of code is a step toward uniform measurement of program size since blank lines and comments require no special programming expertise and will vary in their use from software engineer to software engineer.

Because some lines of code are more difficult to write than others, and since some languages allow multiple lines of code in a single line of text, difficulties arise in using the LOC metric in a uniform manner. One way to overcome these difficulties is to use a count of the number of tokens in the program as a metric of size. Tokens are defined as the lexical units of a program that are distinguishable by a compiler. Logically, if one line of code has more tokens in it than another line of code, then that line of code will be more difficult to develop and debug. The count of the number of tokens in a program is represented as "N".

Tokens may be categorized as either operators or operands. In a typical program, any lexical unit that specifies an action is considered an operator, while any lexical unit that represents data is considered an operand. Operands consist of variables, constants, and labels. Operators consist of the following:

1. mathematical symbols—such as +, −, *, and /,
2. command names—such as DO, READ, and WRITE,
3. special symbols—such as !, ( , ), and :,
4. function names,
5. punctuation marks.

By using these definitions, the size of a program, in terms of the total number of tokens used, may be expressed mathematically by the equation:

$$N=N_1+N_2.$$

Here, $N_1$ is equal to the total number of occurrences of the operators, while $N_2$ is equal to the total number of occurrences of the operands. Two related metrics are $n_1$, which is equal to the number of unique operators, and $n_2$, which is equal to the number of unique operands.

As an example of how to apply these metrics consider the following line of FORTRAN code:

If $((A<3) \cdot \text{or} \cdot (A>5))$ then GO TO 500

An analysis of the tokens in this line of code would consist of the following logical breakdown:

$N_1$=15. The operators are composed of If, (, (, <, ), ·, or, ·, (, >, ), ), then, GO, and TO.

$N_2$=5. The operands consist of A, 3, A, 5, and 500.
Therefore,
N=20.
and, $n_1$=10. The number of unique operators consist of If, (, <, ), ·, or, >, then, GO, and TO.

$n_2$=4. The number of unique operands consist of A, 3, 5, and 500.

The relationships among the metrics of program size, lines of code, normalized lines of code, and token count are expressed in the equation:

$$S = LOC = LOC_n = N/c.$$

The constant "c" depends on the language used. For FORTRAN it is calculated to be about 7. If the previous line of FORTRAN code is considered, then $LOC_n = 20/7 \approx 3$. By using this relationship, the analogy can be made that the effort involved in developing that particular line of code would be approximately equal to the effort involved in developing three normal lines of FORTRAN code. Therefore, by analyzing the size of a program using a token count, a more uniform measurement of programming effort can be made. Large scale studies of assembly language programs and PL/S programs have found that both lines of code and token counts are linearly related and approximately equal as metrics of program size.

SOFTWARE LIFE-CYCLE PROCESS

A software life-cycle process 1 in accordance with the present invention is disclosed in FIG. 1. The process 1 consists of several phases, with each phase having a well-defined beginning and a well-defined ending. These phases, while generally considered sequential, are very interdependent in that changes in one phase may significantly affect activities in later phases.

The life-cycle phases of the process 1 are defined below.

A system requirements definition phase 2 identifies the data flows of the software and provides a first source of information for estimating lines of code, as will be discussed below.

Software requirements analysis phase 4 identifies the data variables of the software and provides a second source of information for estimating lines of code, as will be discussed below. A complete and validated specification of the requirements for the project including data flow diagrams, data access diagrams, mini-specs, and a data dictionary are provided at this phase.

The phases 2 and 4 comprise structured analysis, as will be discussed below.

Preliminary design phase 5 identifies the logical and control variables of the software and provides a third source of information for estimating the lines of code of the software, as will be further discussed below.

Detailed design phase 6 identifies the static variables of the software and provides a fourth source of information for estimating the lines of code. The phases 5 and 6 together comprises structure design, as will be discussed below, that provides a complete and verified design document including the hardware/software architecture, structure charts, expanded data dictionary, and description of each program module along with the user's manuals and test plans for the system.

Coding phase 7 includes implementing the mini-spec into a complete software product.

Test/integration phase 8 provides a complete and verified software product composed of the coded software modules.

Deployment phase 10 provides a complete and verified set of program modules that includes descriptions of the functions of the modules within the system, information concerning the extent of testing on the module, and the specification and design requirements that the module satisfies.

Operation and maintenance phase 12 comprises delivery, maintenance and phaseout. Delivery provides a fully functioning and operational hardware/software system, including the installation of the software product and training for the users. Maintenance provides a fully functioning update of the hardware/software system. If the update is extensive, previous phases may need to be reiterated. This phase is repeated for each update. Phaseout provides the conversion of the system to a successor system or the removal of the system from active production.

In addition to the sequential phases discussed above, most software life-cycles include a verification and validation activity and a configuration management activity. Both of these activities are performed at the completion of each phase. Verification and validation provide an essential step in the successful completion of each of the software life-cycle phases in the verification and validation of the software products of that phase. The verification and validation activity is performed by an independent team whose objectives are to demonstrate that the software products of each phase satisfy the objectives of that phase and the overall objectives of the project; eliminate the errors in the products of that phase; and see that the products of each phase are refined in successive phases.

To successfully complete the configuration and management phase, an independent configuration manager must be able to provide the complete and verified version of the software product or any of the intermediate software products (called baselines). Baselines provide continuity between the management and control of the software process, and the management and control of the software product. It provides the software development process with the advantages that no changes are made without the agreement of all interested parties; the higher threshold for change tends to stabilize the product; and the controller of the configuration process has the definitive version of the product.

Use of the process 1 advantageously provides economic benefits. Studies of software error histories from completed projects show that most errors occur in the early phases of the life-cycle process (specification and design) but are not discovered until the later phases (integration and maintenance). Estimates of the relative cost of correcting an error that occurs in the specification phase but is not discovered until the maintenance phase can be 100 times the cost of correcting the error during the specification phase. Therefore, for a project to be considered cost effective over its entire life-cycle, techniques must be developed that allow for a critical analysis of integration and maintenance problems as early in the software life-cycle as possible.

STRUCTURE ANALYSIS AND DESIGN

The phases 2, 4, 5 and 6 of the process 1 are implemented through structure analysis and design as depicted in a flowchart 13, as best shown in FIG. 2.

Proper requirements specification is critical to the success of any project. The most difficult aspect of properly specifying a software system is the translation of the system concept into a tangible form. Structure analysis, in accordance with the present invention, is a specification technique that will accomplish this task.

In structure analysis, the requirements are presented in a clear and concise manner so that analyst and users can better communicate ideas about the system. The presentation of the requirements allows for a critical analysis of the specification phase as well as provide insight into the design and structure of the later phases of the life-cycle. Continuity is provided between the specification phase and the design phase. Products coming out of the specification phase help the design team achieve the design phase. The structured specification technique produces metrics that help measure the success of the specification effort.

Structure analysis advantageously attempts to overcome the problems of requirements definition by providing the specification team with a set of rigorous specification tools. These tools allow for the critical analysis of software design methods early in the life-cycle process. Structure analysis provides a structured specification that has the following qualities:

1. Graphic and concise—the structured specification contains a graphical representation of the system rather than words. Users are more likely to understand a graphical representation than a wordy specification document.
2. Top-down partitioned—the system is functionally decomposed starting with broad, general processes and ending up with small, independent functions. The resulting specification document can then be carried into the design phase where it should aid the designer in developing a top-down systems design document.
3. Non-redundant—to avoid a duplication of effort, structure analysis provides the tools for recording specification information once and only once. Specification information can then flow into the other phases of the life-cycle in a consistent and accurate manner. This helps designers produce a design document that is consistent with the specification document. In addition, it keeps customers from being overwhelmed by detail.
4. Logical, not physical—a structured specification allows the analyst to concentrate on the logical decisions involving the system, and to defer physical decisions until the specification phase is completed and the design phase has started. This allows the system design team to make physical assessments about the system during the proper life-cycle phase.

A software system developed using a structured specification provides the user with a better understanding of the software product. Furthermore, the designer can produce a structure design that is more consistent with the structured specification.

Structured software analysis comprises two steps. The first step is the top-down decomposition of the software system into smaller, more manageable processes. The second step is the bottom-up synthesis of the smaller, more manageable processes into a workable system.

Structure analysis and design comprises a step 14 of partitioning the functional processes of a system into data flow diagrams, a step 16 of partitioning the data flow diagrams into functional primitives, a step 18 of generating data dictionary, a step 20 of translating the functional primitives into mini-specs, a step 22 of transforming the data flow diagrams into structure charts, and a step 24 of refining the mini-specs, as best shown in FIG. 2. Coding step 25 implements the refined mini-spec into a complete software product, thereby providing the actual number of line of code.

DATA FLOW DIAGRAMS

Data flow diagrams (DFD's) are the principal tools in converting the concept of a system into a tangible form. DFD's accomplish this task by portraying the processes and data elements comprising a software system as a network.

DFD's are used to functionally decompose and partition the processes of a specified system. A typical data flow diagram 25 comprises data flows 26, processes 28, a data store 30, a source 32 and sink 34, as best shown in FIG. 3.

The data flow 26 can be thought of as an assembly line that carries information to a series of work stations. The work stations then refine the data into a workable product. The direction of the arrow shows which way the data is flowing.

The process 28 can refine data in either of two ways; namely, it can transform the structure of the data or, it can transform the value of the data. If the name of the data flowing out of a process is different from the name of the data flowing into a process then that data has been transformed.

The data store 30 is a temporary storage place for data elements. It has two purposes in structure analysis. First, it allows a process 28 to access a data element more than once. Second, it allows a process 28 to use information in a random order. In either case, data flows alone will not accomplish the task.

The source 32 shows where the system's data comes from, while the sink 34 shows where the data goes after being transformed by the system. The source 32 is a provider of data flows 26 for the system and the sink 34 is a receiver of data flows 26 from the system. Sources and sinks, along with processes and data flows, delineate the domain of study for a data flow diagram.

LEVELING DATA FLOW DIAGRAMS

The DFD's for a sizable system may require thousands of processes. A data flow diagram large enough to hold all of these processes would be unmanageable. To avoid this problem, the DFD is partitioned (or leveled) in a top-down manner, as shown in FIGS. 4 and 5, where a single process 38 is partitioned or leveled into multiple processes 40, 42 and 44.

Figure 4:
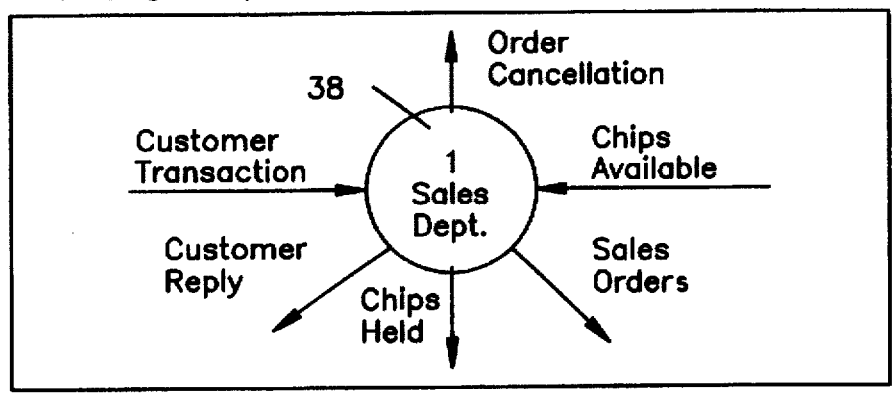
FIG. 4 is an exemplary chart of a single process from a data flow diagram.
Figure 5:
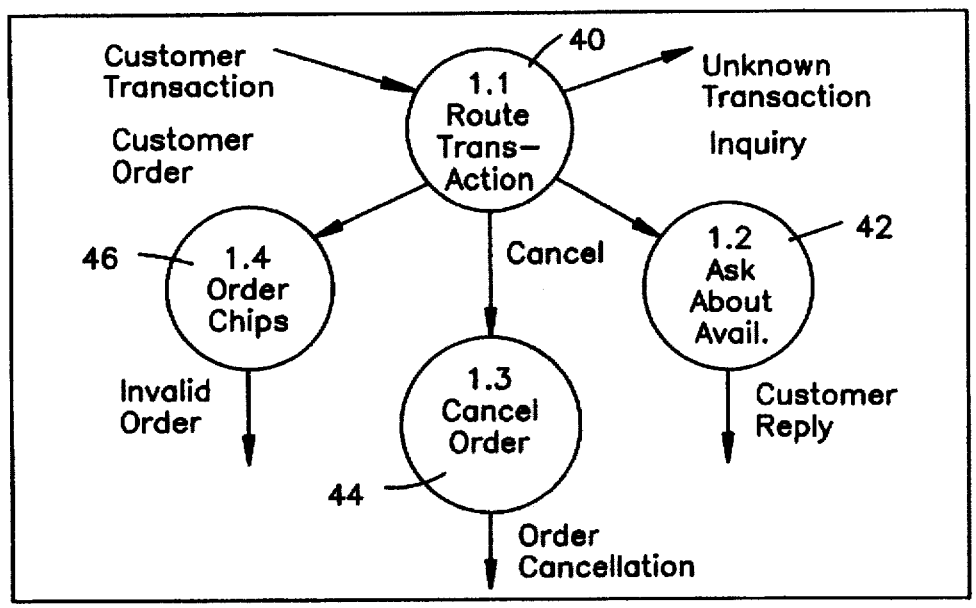
FIG. 5 is an exemplary chart of a leveled process showing in greater detail the process of FIG. 4.

The afferent and efferent data flows in FIG. 4 correspond to the afferent and efferent data flows in FIG. 5. FIG. 5 is a more descriptive view of FIG. 4. Process 38 is the parent of processes 40, 42, 44 and 46.

Figure 6:
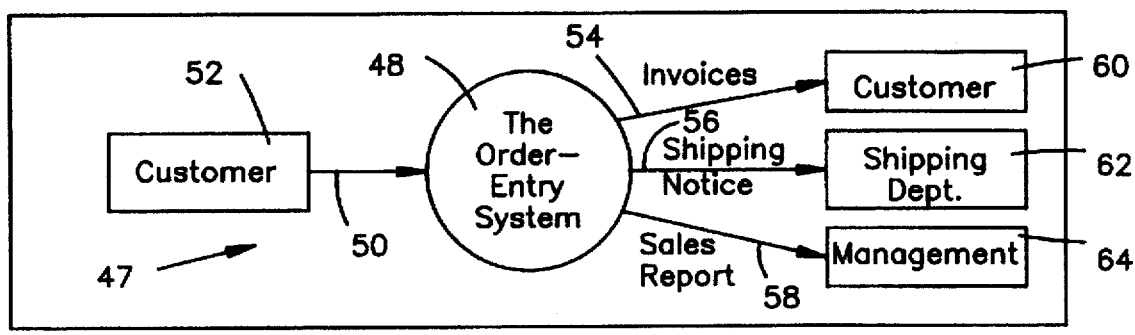
FIG. 6 is an exemplary context diagram of a data flow diagram set.

An exemplary context diagram 47 is disclosed in FIG. 6. Process 48 appears in the top diagram of the DFD set. The context diagram 47 contains one process 48 which represents the system under analysis, the inputs 50 to that system and their sources 52, and the outputs 54, 56 and 58 from that system and their sinks 60, 62 and 64. It is used to isolate the domain of the analysis and defines the system in terms of its inputs and outputs.

LINES OF CODE PREDICTOR METRICS FROM STRUCTURE ANALYSIS AND DESIG

Data flow diagrams provide the functionally partitioned modules of a software system with the data that flows in and out of each module. For each module the number of data flows (DF) are an $LOC_n$ predictor metric for the final size of the software product such that:

$$LOC_n = a_1 + b_1 * DF.$$

The $LOC_n$ could be predicted in step 63 for each module defined by a data flow diagram in accordance with the present invention, as best shown in FIG. 2. Consequently, the size of the software product could be predicted early in the development life-cycle process.

DATA DICTIONARY

The data dictionary produced during structured analysis gives rigor to data flow diagrams by providing the analyst with a central repository of data definitions. This includes definitions of all data stores, unique data flows, and functional primitives, as will be explained below.

A data flow that can be decomposed farther is defined in terms of its components. Components consist of other data flows and data elements. A data element is a data flow that cannot be decomposed any further. It is defined in terms of the meaning of each of the values that it can assume. For example:

| data flow | data elements |
|---|---|
| telephnumber | = area code + local number + extension |

The data dictionary furnishes the software life-cycle with its first attempt at defining the variables that will be used to implement the system. Since this is a further refinement of the number of data variables within the system, then a multiple linear regression exists such that, $$LOC_n = a_2 + b_2 * DF + c_2 * DD,$$

where DD represents the sum of the number of unique data elements in the data dictionary for a particular process. This equation advantageously provides a further refinement of the $LOC_n$ estimate in step 65 using both the number of data flows and the number of data elements for a module that become available during the phase 4 of the life-cycle process and the steps 16 and 18, as best shown in FIG. 2.

MINI-SPECS

Data flow diagrams alone do not specify a software system, but they do provide a tool for decomposing the system into successively smaller processes. The processes that cannot be decomposed any farther are called functional primitives. It is the functional primitives of the system that are formally specified. If each functional primitive is specified in a concise and independent manner, then processes at higher levels do not need to be specified since they are nothing more than a collection of lower-level processes.

The specifications for the functional primitives are called mini-specs. Since English is a fairly subjective language, some goals for writing mini-specs include the following:

1. Each functional primitive should be represented by one mini-spec.
2. The mini-spec should express the manner in which data is transformed upon entering and leaving the functional primitive.
3. This transformation should be stated in general terms, leaving the specifics to the design phase.
4. The terms describing the transformation should be simple and concise, reflecting a standardized expression throughout the document.

Although structure analysis offers several tools for expressing mini-specs, structured English is the most commonly used. As a specification tool, structured English provides the analyst with a subset of English for defining the transformations that occur in a functional primitive. Its vocabulary includes the following:

1. transitive verbs,
2. objects and qualifiers from the data dictionary,
3. conjunctions used to imply logic such as "if" and "while",
4. relational comparisons such as "or", "not", and "less than".

The syntax of structured English is composed simple sentences, closed-end decisions, closed-end repetitions, and combinations thereof.

A simple mini-spec depicted in FIG. 7 demonstrates the ability of structured English to express a functional primitive in a concise manner. Since every functional primitive should have a mini-spec, there should be a way of mapping the functional primitive to the mini-spec. This is accomplished by using the number of the functional primitive on the data flow diagram as the prefix for the mini-spec. For the example in FIG. 7, the prefix of the mini-spec (5.4.3) corresponds to the number of the functional primitive.

Advantageously, mini-specs provide a good tool for developing software design requirements during the design phase of the life-cycle.

Structure analysis furnishes solutions to a number of problems inherent to the specification phase of the software life-cycle. Data flow diagrams are used to present specification requirements in a clear and concise manner. Data flow diagrams, the data dictionary, and mini-specs provide a method for critically evaluating the quality of the solution derived during the specification phase. All of the products of structure analysis are also used during the design phase to develop a structure design. This provides continuity between the specification and design phases.

Structure analysis provides two iterations of refinement (DF and DD) for determining the amount of data in a module. The amount of data in a module is advantageously used to predict the size of a software system during the early phases of the software life-cycle process.

The design phase of the software life-cycle may be considered as the bridge between the specification phase and the implementation phase of the software project. Its primary goal is to translate a specification document into a rigorous design document that can be used by a software engineer as a guide for implementing code. In this regard, a structured design document may be considered as the blueprint for programming a software system.

A structured design document provides graphical tools that allow the design to be presented to the user in a clear and concise manner. These tools provide the designer with the capability of partitioning large problems into successively smaller problems. The structured design document allows for a critical analysis of the products of the design phase and provide insight into the problems of the implementation phase of the software life-cycle. Continuity is provided between the specification phase and the implementation phase of the life-cycle. In particular, the products of the design phase derive from the products of the specification phase, while the code developed during the implementation phase derives from the products of the design phase. The design tool advantageously produces metrics that are used to measure the level of the implementation effort.

As a software development tool, structure design provides the system designer with a disciplined approach for transforming the products of structure analysis into the products of structure design. In particular, the data flow diagrams of structure analysis are refined into a more detailed graphical product called structure charts 65, as best shown in FIG. 8, while the mini-specs that describe the processes within the data flow diagrams are refined into a more detailed description of the functions partitioned by the structure charts, as best shown in FIG. 11.

A structure chart is a graphical tool that represents the manner in which a system will be implemented. It is derived from the data flow diagrams that were developed during structure analysis. Structure charts are used to partition large or complex systems into smaller more manageable modules for coding.

As the primary tool in structure design, structure charts are used to graphically depict the following information:

1. the partitioning of a process into smaller modules,
2. the top-down organization of the modules,
3. the data flowing into and out of a module,
4. a functional description of the modules.

The structure chart 65 comprises modules 66, connections 68, and couples 70, as best shown in FIG. 8. Each module 66 represents a single subroutine within the system. Each connection 68 is used to symbolize a call from one module to another. Each couple 70 represents a data flow from one module to another.

The data flow diagrams of structured analysis are a graphical statement of the requirements for a software system. They reflect what has to be done to implement the system. The structure charts of structured design are graphical statements of the design of a system. They reflect how the requirements of a system will be implemented. The similarities between the two are the same as the similarities between intent and method. As a result, structure charts have properties similar to the properties of DFD's.

TRANSFORM ANALYSIS

The strategy for converting data flow diagrams into structure charts is called transform analysis. Referring to the data flow diagram in FIG. 9, a transform analysis on this data flow diagram produces the structure chart shown in FIG. 10. While these two diagrams may seem very different, the mechanism for converting a data flow diagram into a structure chart is a very logical and methodical process.

Figure 10:
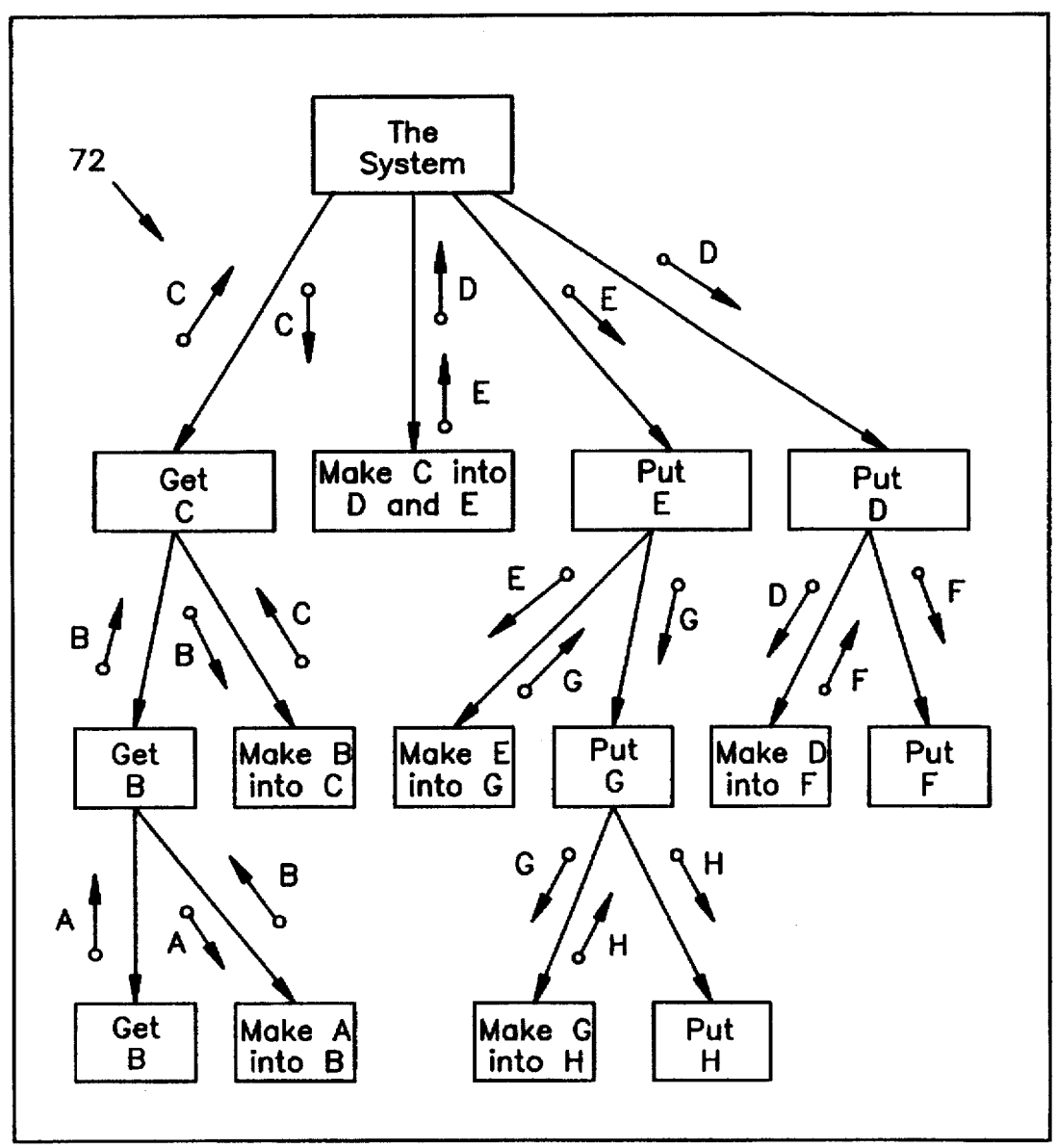
FIG. 10 is the associated structure chart of FIG. 9.

The process of performing transform analysis on the data flow diagram 71 of FIG. 9 to produce the structure chart 72 of FIG. 10 is composed of the following five steps:

1. Drawing the DFD.
2. Identifying the Central Transform—the central transform is the process that translates the raw data going into the DFD into the refined data forms required for the system to function properly. It is independent of the input and output of the system. The central transform can be identified by using the following strategy (see FIG. 9):
   A. Tracing each afferent (input) data flow from the outside of the DFD to the middle. Mark the process that represents the input in its most refined state.
   B. Tracing each efferent (output) data flow from the outside of the DFD to the middle. Mark the process that represents the output in its least refined state.
   C. Choosing the central transform from the remaining process or processes.
3. Producing a Rough Structure Chart—One of the differences between a DFD and a structure chart is that a structure chart expands the capability of a DFD by showing the flow of the logic and control information as well as the flow of the data. Therefore, allow the central transform to become the control module for the system.
4. Refining the Rough Structure Chart—Some guidelines for refining the rough structure chart follow:
   A. Adding modules for each afferent and efferent data flow.
   B. Adding error handling routines.
   C. Adding initialization and termination routines.
   D. Defining the logical and control variables flowing into each module.

The process of transform analysis advantageously expands the number of variables defined for each module during structure analysis to include logical and control variables. A multiple linear regression exists for each module such that, $$LOC_n = a_3 + b_3 * DF + d_3 * LC,$$

where LC is the sum of the number of logical and control variables. This equation advantageously provides a further refinement of the $LOC_n$ estimate in step 67 using the number of data flows and the number of logical and control variables that become available from the structured charts in step 22, as best shown in FIG. 2.

5. Making Sure the Design Works—Perform a hand simulation on the module to make sure that it meets the requirements specification, then meet with the user and review the module. This will help ensure that the module is correct.

TRANSLATING MINI-SPECS INTO PSEUDOCODE

At this point, all of the structure charts have been partitioned and all of the input and output variables required by the structure charts have been defined. The only task left is to translate the mini-specs defined during structure analysis into a detailed description of the processes partitioned by the structure charts. A programming language of choice is used to describe the processes of the structure charts instead of some form of pseudocode. The use of a programming language to describe the structure charts produced during the design phase would create a product that could be easily carried over to the coding or implementation phase of the software life-cycle process.

The translation of the mini-specs into a programming language includes the following goals:

1. The processes partitioned by the structure charts are described using the constructs of the implementation language.
2. All of the input, output, and static variables for the structure chart are defined using the constructs of the implementation language.

As an example of this process, the mini-specs in FIG. 7 coded in FORTRAN would result in the program disclosed in FIG. 11.

Although simplified as an example, target, X_coord, Y_coord, speed, and moving have already been defined as input/output variables, while valid is a static variable defined only within the subroutine. Another regression exists such that, $$LOC_n = a_5 + b_5 * VARS,$$

where VARS is the sum of the number of unique variables within the software module.

At this point, all of the unique variables (VARS) within the software module are defined and the following equation should be satisfied, $$DFE=DD+LC.$$

where DFE=the data elements flowing (DFE) between software modules.

Substitution into the equation VARS=DFE+SV, where SV=the static variables (SV), which are the variables that exist only during the execution of the module provides the following relationship, $$VARS=DD+LC+SV.$$

Using Wang's simple linear regression equation for predicting $LOC_n$, and the following relationship is obtained, $$LOC_n = a_1 + b_1*(VARS) = a_1 + b_1*(DD+LC+SV) = a_4 + b_4*DD + c_4*LC + d_4*SV.$$

Since DF is a subset of VARS that is continuously refined during the process of specification and design, one more relationship exists such that, $$LOC_n = a_1 + b_1*(DF+DD+LC+SV) = a_5 + b_5*DF + c_5*DD + d_5*LC + e_5*SV,$$

which is a variation of the equation, $$LOC_n = a_s + b_s VARS.$$

Translating the mini-specs into a program design language provides the final step in determining the number of unique variables (VARS) in a software module. VARS is advantageously used to determine the $LOC_n$ in step 69 for each module in the system, as best shown in FIG. 2, and the sum of the $LOC_n$ for each module in the system is used to determine the total $LOC_n$ for the entire programming effort.

The above description sets forth strategies for translating the data flow diagrams and mini-specs of a structured specification into the structure charts and structure chart descriptions of a structure design. These strategies contribute the following products to the design phase of the software life-cycle:

1. Structure charts as a graphical tool for partitioning systems into successively smaller processes.
2. A design product that can be critically analyzed.
3. Structure chart descriptions provide continuity between the specification and implementation phases of the life-cycle.
4. The definition of logic, control, and static variables during the design phase provides further refinements of the count of the number of unique variables within a module.
5. The refinement of the count of the number of unique variables within a module provides further refinements of the estimate of the number of lines of code required to implement the system.

The transformation of data flow diagrams into structure charts is accomplished by transform analysis, which enables the software engineer to translate the network of processes that comprise a data flow diagram into the hierarchy of modules that form a structure chart. By deriving the structure design from a structured specification, continuity is provided between the specification and implementation phases of the software life-cycle.

The refinement of the structure charts to include logic and control variables and the refinement of the structure chart descriptions to include static variables provide a significant VARS metric for predicting the size of a software module and, subsequently, the size of a software system.

VARS was defined as the number of unique variables required to implement a program. Structure analysis and design used to define a life-cycle process for the software development effort determines the subsets of the VARS metric during the earlier phases of the life-cycle. Wang has shown that VARS can be used as a predictor metric for LOC. Since one of the goals of structure analysis and design is to identify all of the unique variables required to implement a software module, Wang's equation can be used at the end of structure design to predict the size of a program.

As the life-cycle progresses, subsets of VARS are defined such that DD is equal to the number of data elements in the data dictionary, LC is equal to the number of logical and control variables, and SV is equal to the number of static variables within the module. VARS is equal to the sum of DD, LC, and SV.

Thus, the techniques of structure analysis and design provide early on in the software development process the number and the type of variables required to implement the software module and a graphical depiction of the software module and its interaction with other modules.

LINES OF CODE EQUATIONS

The information developed in the foregoing discussion is reduced to a set of equations that are used for estimating the size of a software module in terms of the number of lines of code ($LOC_n$) required to implement it. $LOC_n$ was used as a metric of program size because of the advantages it provides to the software engineer as a measurable characteristic of the effort required to complete a physical delivery of the software system.

Models that estimate the characteristics of a system based on the knowledge accumulated from the characteristics of the individual components of the system and their interactions are called micro models. If the components of the model that are identified during structure analysis and design are used to estimate $LOC_n$ at the module level, then the products of structure analysis and design are used as a micro model for estimating program size.

From the above, for a metric to be considered useful, it should be measurable. The estimated measurements made by the metric should converge with actual results as the estimates are refined during the life-cycle of the project and, eventually, be resolvable with observed fact. The model is composed of DF, DD, LC, and SV, which is developed by a step-wise multiple linear regression analysis of these metrics, since DF, DD, LC, and SV become known at consecutive stages of the software life-cycle process.

The advantage of using structure analysis and structure design is that it provides a set of tools that can be used for top-down software design followed by a bottom-up estimation of the program's size. The advantages of structured programming and top-down design have been covered in the above.

Bottom-up estimates tend to be more accurate, especially for large projects, because the errors of estimation that occur for the various components tend to balance out over the long run. In addition, the effort required to incur a bottom-up estimate provides a better understanding of the overall job to be done.

Through tedious research, Table 1 was derived from several software modules that are a part of a medium scale data acquisition and display system developed for NASA during the fall of 1988 through the spring of 1989. The completed system consisted of 111 software modules written in FORTRAN and Motorola 68000 assembly language for a total of approximately 7000 LOC.

Although the NASA data acquisition and display system was implemented using the tools of structured programming, not all of the tools of structure analysis and design were used. The specification phase of the system was accomplished using data flow diagrams and mini-specs. A fully expanded data dictionary was not developed. The design phase was completed by translating the mini-specs developed during the specification phase into program descriptions using FORTRAN as a program design language (PDL). The data flow diagrams that were developed during the specification phase were not transformed into structure charts.

TABLE 1

Structured Design and Analysis Data

| | MODULE | LOC | N | $LOC_n$ | DF | DD | LC | SV | VARS |
|---|---|---|---|---|---|---|---|---|---|
| 1. | CVTINT | 21 | 131 | 19 | 2 | 2 | 1 | 1 | 4 |
| 2. | DSYINF | 31 | 208 | 30 | 8 | 2 | 3 | 1 | 6 |
| 3. | MODDSC | 27 | 225 | 32 | 4 | 7 | 2 | 0 | 9 |
| 4. | ADSHST | 66 | 444 | 63 | 20 | 8 | 3 | 1 | 12 |
| 5. | MDSHST | 95 | 710 | 101 | 24 | 7 | 4 | 1 | 12 |
| 6. | STNRPT | 63 | 749 | 107 | 10 | 15 | 7 | 0 | 22 |
| 7. | SPTRPT | 73 | 882 | 126 | 10 | 18 | 9 | 0 | 27 |
| 8. | ASTHST | 154 | 1,112 | 159 | 26 | 11 | 9 | 3 | 23 |
| | TOTAL | 524 | 4,461 | 637 | 104 | 70 | 38 | 7 | 115 |

Even without the use of an expanded data dictionary or structure charts the data dictionary variables and the logic and control variables could be easily identified in each of the completed software modules. The data flow diagrams, variable classifications, token counts, and delivered source lines of code may be reviewed in Leonard, Ricky Jack, *A Convergent Model for Predicting Software Programming Effort*, University of Alabama in Huntsville, December 1991, incorporated herein by reference.

The column labeled MODULE in Table 1 reflects the name of the FORTRAN subroutine. For this compiler, the name of the module was restricted to six characters.

The LOC column refers to the number of delivered source lines of code in each module. N is the total number of tokens and $LOC_n$ is equal to N/c where c is equal to the average number of tokens in a line of code. As discussed, c≈7 for one line of FORTRAN.

DF refers to the number of data flows for the module. DD, LC, and SV are the number of data dictionary variables, logic and control variables, and static variables, respectively. VARS should be equal to DD+LC+SV.

The information presented in Table 1 was gathered to derive the coefficients for the regression equations developed in the foregoing discussion. The ranges for $LOC_n$ regarding the structured data set may be reviewed in Table 2.

TABLE 2

LOC Ranges for the structured Data Set

| Minimum | Maximum | Mean | Std Dev | Std Error | Variance |
|---|---|---|---|---|---|
| 19 | 159 | 79.6 | 51.2 | 18.10 | 2,619.98 |

As in the previous discussion, the components of the model are analyzed in the same order in which they become available during the structured software development life-cycle process. For the early specification phase, when a regression is performed for $LOC_n$ versus DF, the following equation is produced:

$$LOC_n = -29.027 + 3.892 * DF + e,$$

where e=standard error for regression.

During the late specification phase of the structured software development life-cycle process the data dictionary variables (DD) are defined. For the multiple linear regression of $LOC_n$ with DF and DD, the following equation is produced:

$$LOC_n = -11.434 + 3.072 * DF + 5.843 * DD + e.$$

The next step in the structured software development life-cycle process is the identification of the number of logic and control variables (LC) required by the software module. Ideally, a three variable multiple linear regression of $LOC_n$ with DF, DD, and LC will produce a better predictor metric for $LOC_n$ than LC alone.

The multiple linear regression of $LOC_n$ with DF, DD and LC produces the following equation:

$$LOC_n = -8.704 + 2.081 * DF + 1.137 * DD + 10.715 * LC + e.$$

Due to the insignificance of the DD coefficient in the DF, DD, and LC regression a modification will be made to the equation discarding DD such that, $$LOC_n = a_3 + b_3 * DF + c_3 * LC + e.$$

The multiple linear regression of $LOC_n$ with DF and LC produces the following equation:

$$LOC_n = -5.729 + 1.942 * DF + 12.654 * LC + e.$$

At this point, every statistic for the multiple regression of $LOC_n$ versus DF and LC is better than any of the previous regressions. The joint DF and LC regression is advantageously available at the beginning of the design phase while the VARS metric does not become available until the end of design.

The static variables (SV) in a software module are the variables that are active only while the module is being executed. They are not passed as parameters to other modules for further refinement. The number of static variables in a module becomes available for analysis at the end of the design phase and completes the equation, $VARS=DD+LC+SV.$ An analysis of the regression coefficients for the DF, DD, LC, and SV regression produces the following equation:

$LOC_n = -11.593+1.799*DF+2.51*DD+8.545*LC+6.033*SV+e,$
$=1.583+5.429*(DD+LC+SV)+e, =1.583+5.429*(VARS)+e,$ since
$VARS=DD+LC+SV.$ Considering the goals for establishing a good model, the estimates of $LOC_n$ provided by the multiple regressions converge extremely well with actual data as the life-cycle progresses.

The real strength of this model lies in the fact that it measures each module very precisely. The errors involved in estimating module size for large scale systems having many modules will tend to cancel each other out. The size of some modules will be slightly overestimated while the size of others will be slightly underestimated. If the project has been properly specified and designed, the use of this model results in accurate, converging estimates of $LOC_n$ for the software system.

Structure analysis and design methodologies provide a set of tools that attack the problems associated with the development of a good software module. By refining the products defined during each phase of the software life-cycle process, structure analysis and design provide an easy transition from one phase of the life-cycle to the next. This establishes a well defined and integrated solution to the problems that are inherent to the software development life-cycle.

The structure analysis and design approach provides a top-down analysis of the software system. The set of linear regression equations defined by the present invention offers a complementary bottom-up synthesis of the software modules for each refinement of the software system made during the software development life-cycle process. Using both approaches furnishes a two-way analysis of the system which should make it easier to identify problem areas within the software product.

COMPUTERIZED INTERACTIVE SYSTEM

Figure 12:
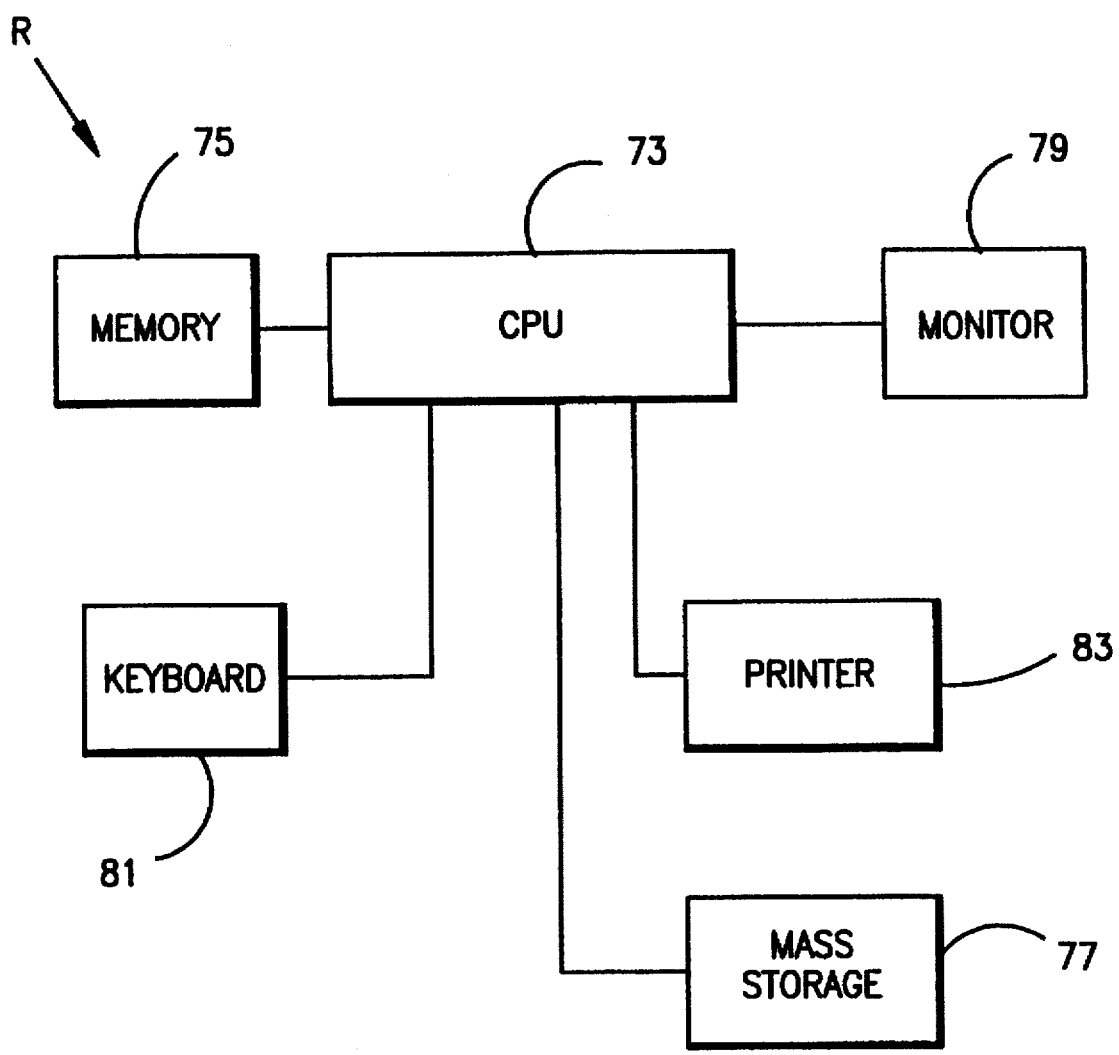
FIG. 12 is a schematic functional block diagram of a standard computer hardware configuration programmed to operate in accordance with the present invention.

An interactive computer system R embodying the present invention is disclosed in FIG. 12. The system R comprises a CPU 73 that is programmed with an interactive software in accordance with the present invention, memory 75 for temporary storage of the software during execution, mass storage 77 for permanent storage of the software, monitor 79, keyboard 81 and printer 83. The hardware configuration for the system R is conventional, which may be a workstation, mainframe, or a standard IBM (registered trademark) compatible PC system with a standard operating software, such as DOS, and a graphical user interface, such as Microsoft Windows (registered trademark).

The interactive computer software or program is disclosed in high level flowcharts, as best shown in FIGS. 13, 14, 15, 16 and 17. The flowcharts may be implemented in any computer language available, such as C, Fortran, ADA, etc. and stored in the mass storage 77, which may be a floppy disk, CD-ROM, hard drive, tape cartridge, etc.

Figure 13:
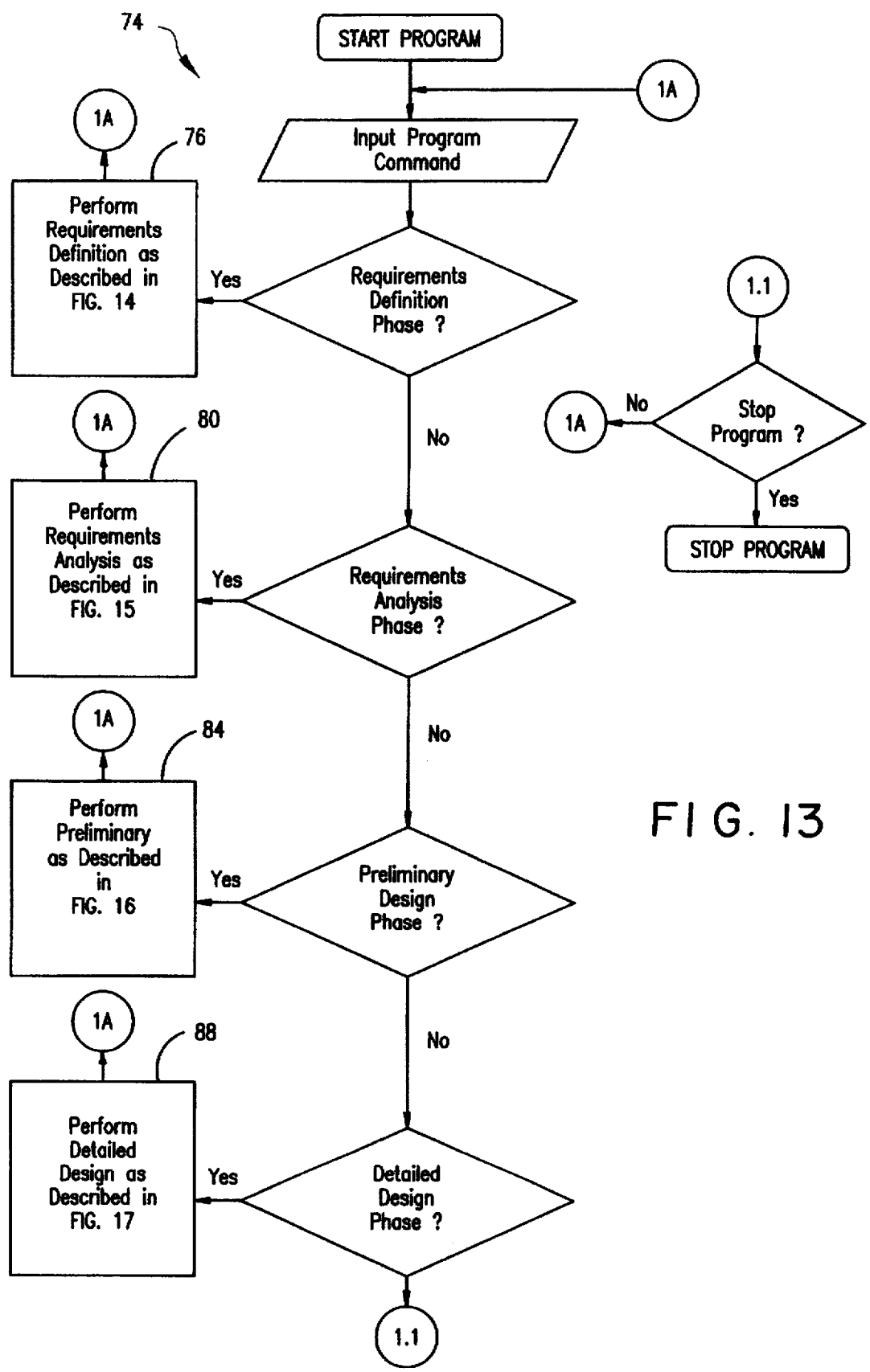
FIG. 13 is a flow chart depicting the logic design to implement the main driver code routines for the interactive software engineering program of the present invention.
Figure 14:
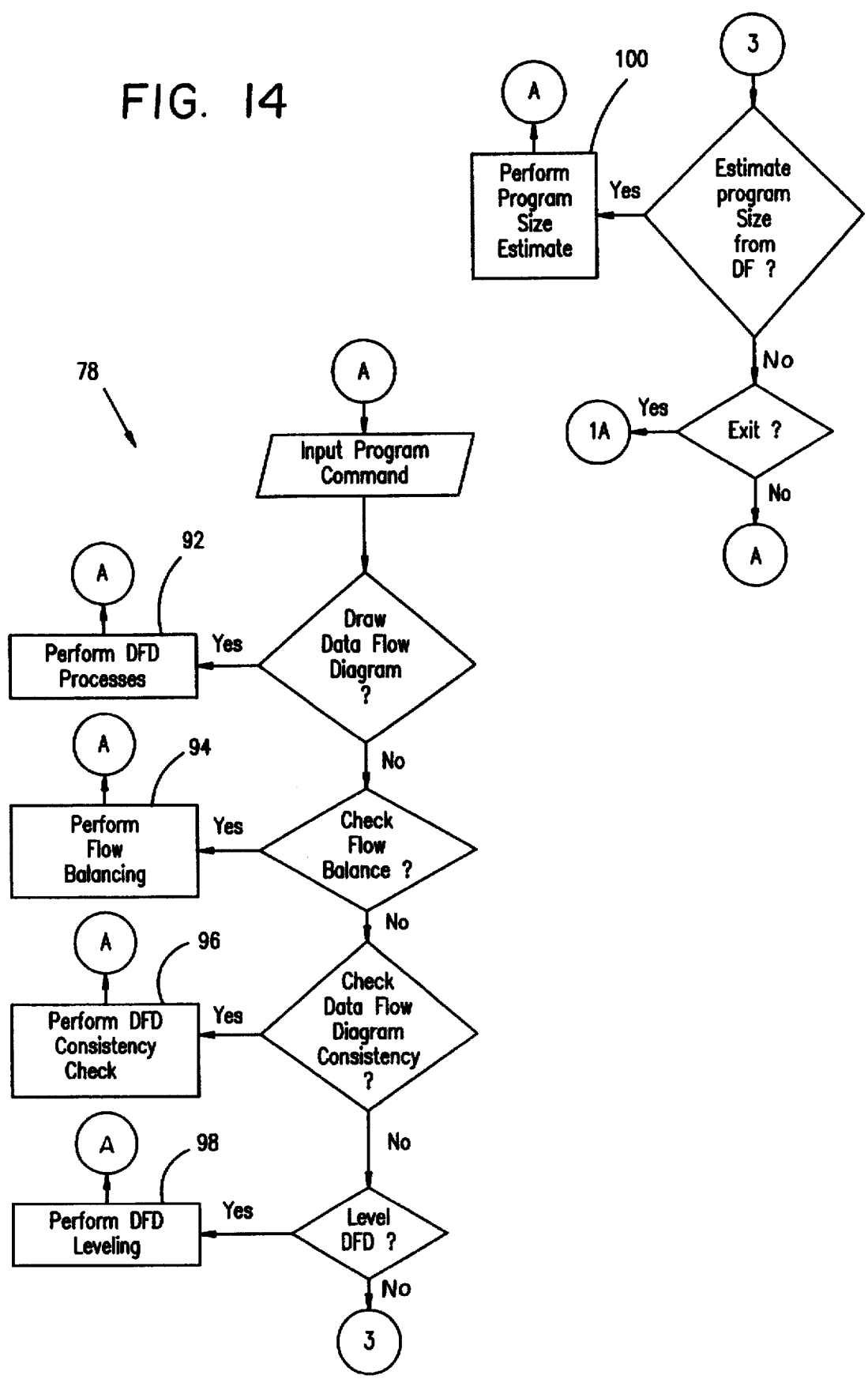
FIG. 14 is a flow chart depicting the requirements definition code routines of the present invention.

The interactive software includes a main driver code routines 74, as best shown in FIG. 13. The interactive software uses a life-cycle model that separates the software product development process into sequential phases. The following life-cycle phases are used as menu choices for the user in the main driver code routines 74:
Requirements Definition
Requirements Analysis
Preliminary Design Specification
Detailed Design Specification If the user chooses the requirements definition phase, the user is then taken to the requirements definition step 76, which identifies the data flows of the software product being developed and provides a first source of information for estimating eventual lines of code of the software product. The step 76 is elaborated in the requirements definition code routines 78, as best shown in FIG. 14.

Figure 15:
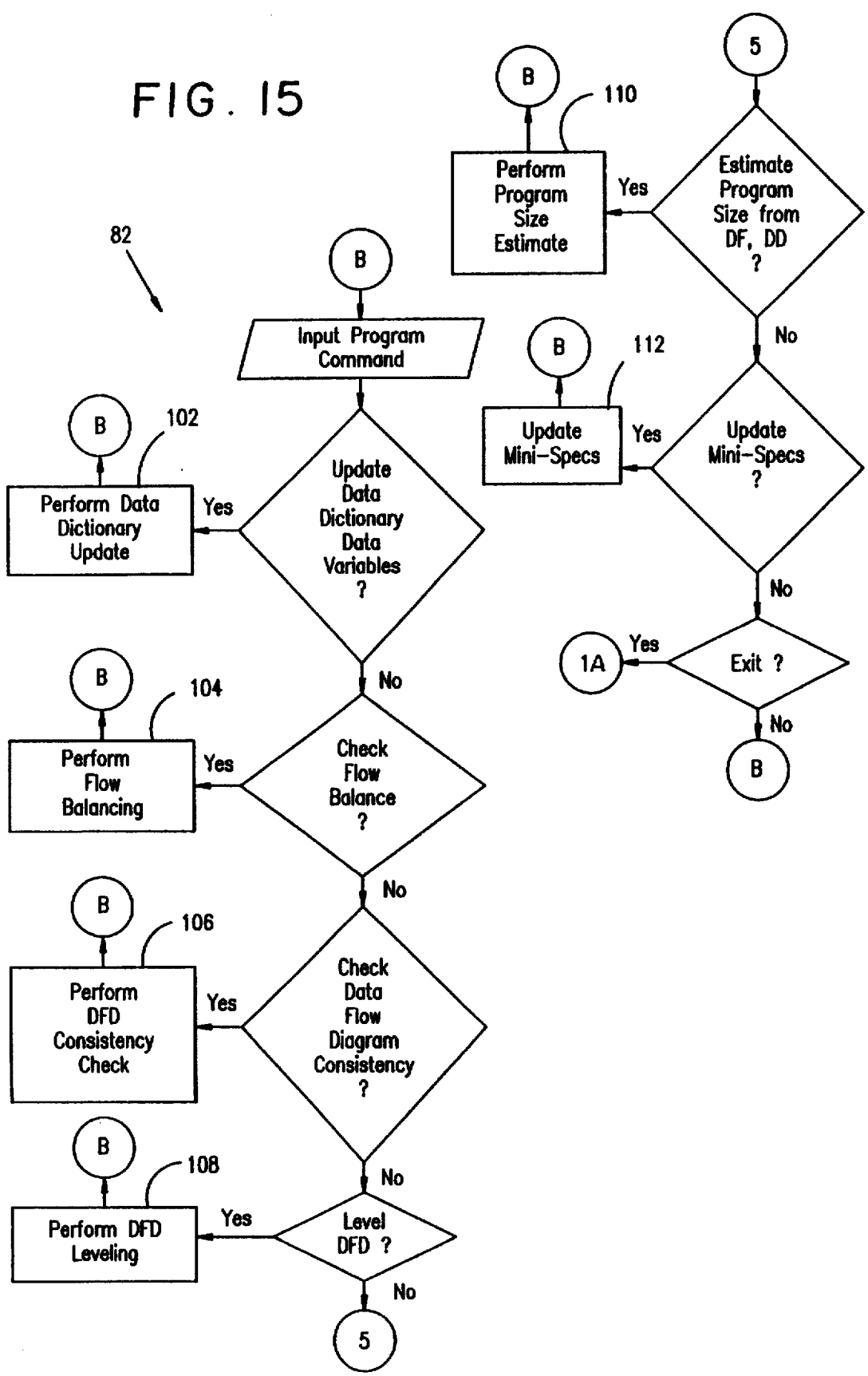
FIG. 15 is a flow chart depicting the requirements analysis code routines in accordance with the present invention.

If the user chooses the requirements analysis phase, then the user is taken to the requirements analysis step 80, which identifies the data variables of the software product being developed and provides a second source of information for estimating lines of code. The step 80 is elaborated in the requirements analysis code routines 82, as best shown in FIG. 15.

Figure 16:
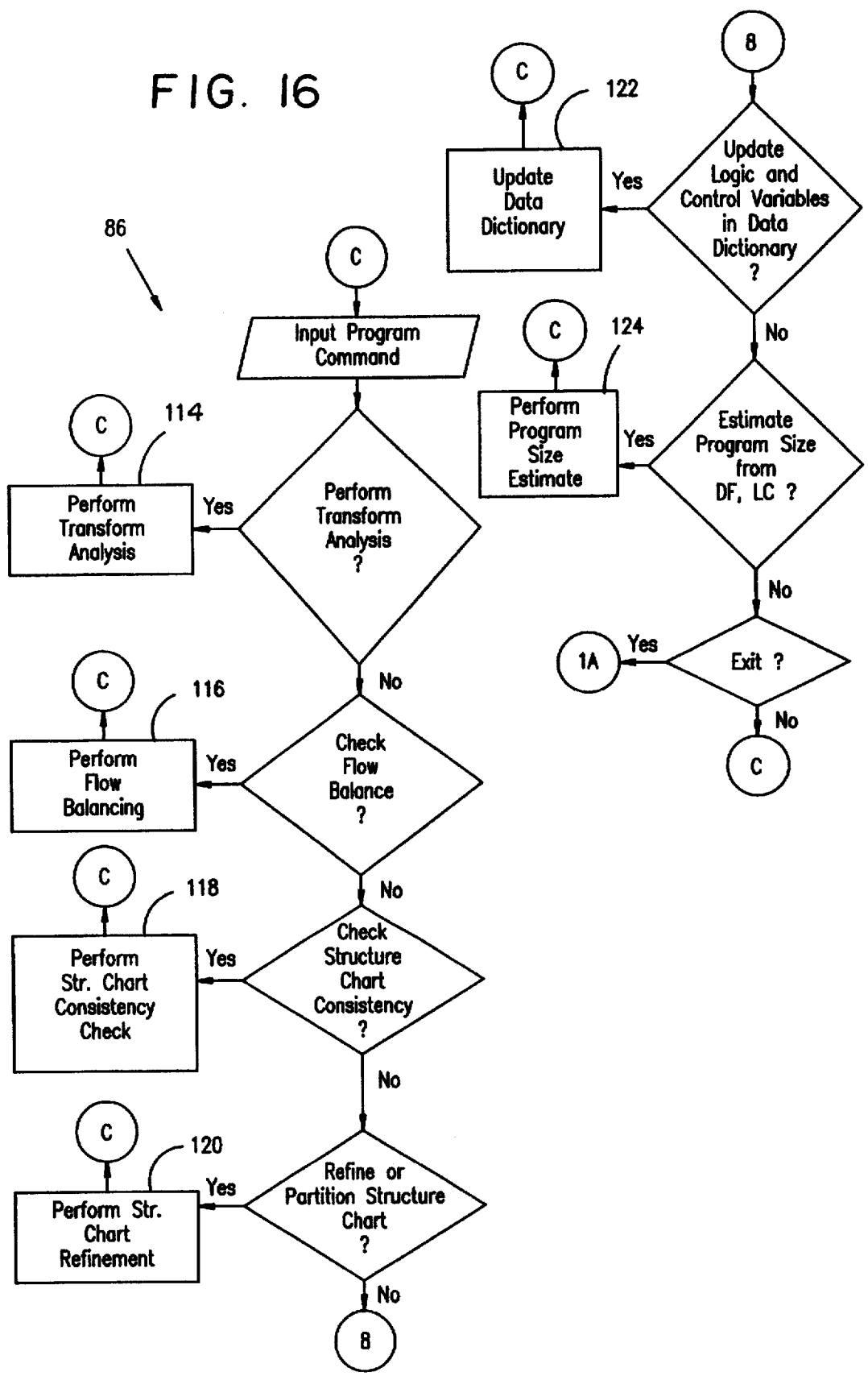
FIG. 16 is a flow chart depicting the preliminary design phase code routines in accordance with the present invention.

If the user chooses the preliminary design phase, the user is taken to the preliminary design step 84, which identifies the logical and control variables of the software product being developed and provides a third source of information for estimating the final lines of code of the software product. The step 84 is elaborated in the preliminary design phase code routines 86, as best shown in FIG. 16.

Figure 17:
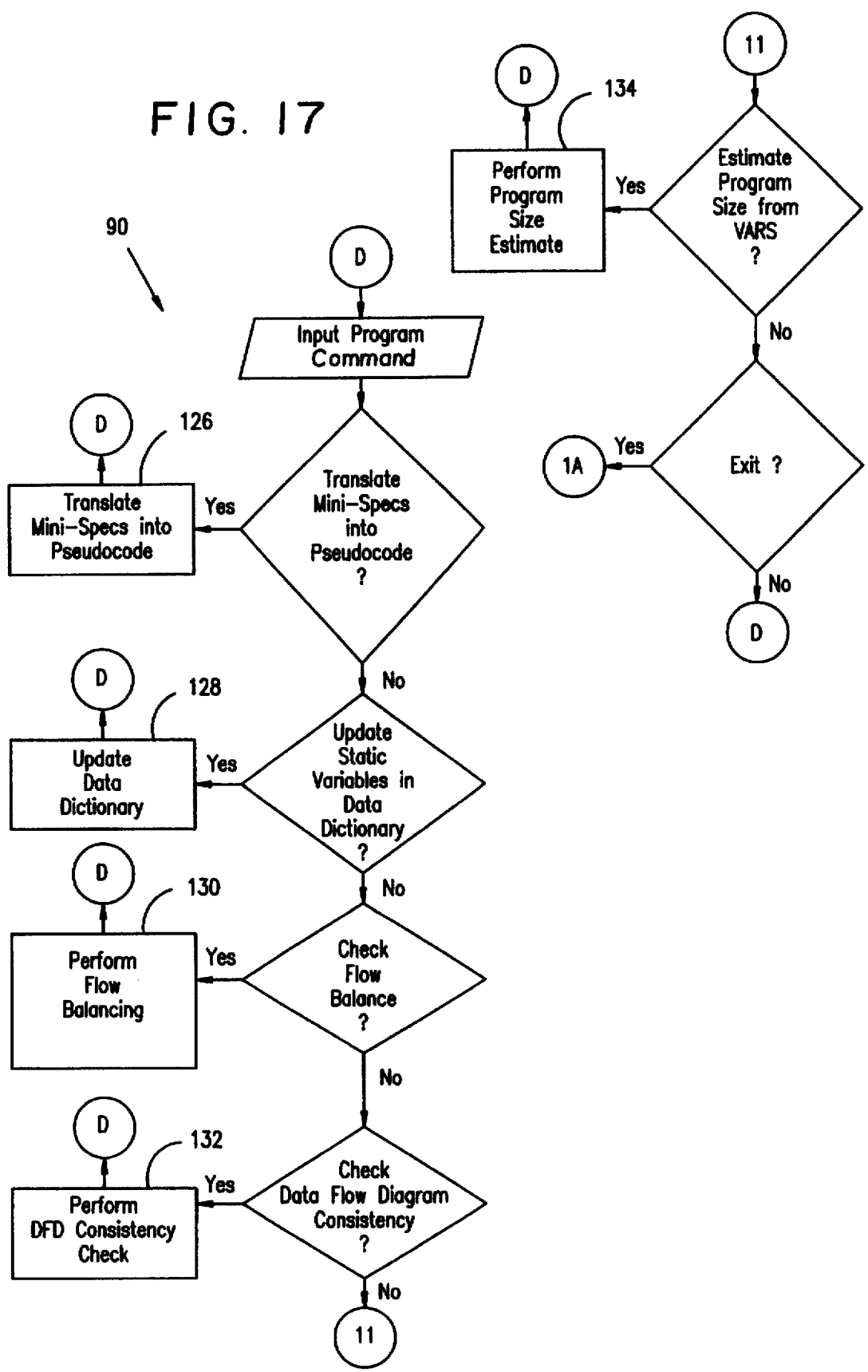
FIG. 17 is a flow chart depicting the detailed design phase code routines of the present invention.

If the user chooses the detailed design phase, the user is taken to the detailed design step 88, which identifies the static variables of the software product being developed and provides a fourth source of information for estimating the final lines of code of the software product. The step 88 is elaborated in the detailed design phase code routines 90, as best shown in FIG. 17.

The various equations for predicting the final lines of code ($LOC_n$) of the software product being developed have been developed above and are summarized in the following Table 3f.

TABLE 3

Equations for Predicting LOCn

| Life-Cycle Phase | Metric | Equation |
|---|---|---|
| Req. Defin. | DF | $LOC_n = 29.027 + 3.892*DF$ |
| Req. Analy. | DF DD | $LOC_n = -11.434 + 3.072*DF + 5.843*DD$ |
| Prel. Design | DF LC | $LOC_n = -5.729 + 1.942*DF + 12.654*LC$ |
| Detail Design | VARS | $LOC_n = 1.583 + 5.429*VARS$ $VARS = DD + LC + SV.$ |

REQUIREMENTS DEFINITION

Referring to FIG. 14, the requirements definition code routines 78 depicts the computer implementation of the requirement specification's definition phase within the interactive software used to develop a software product.

The interactive software provides the following specification tools on screen:
1. a data flow diagram (dfd),
2. a method of accessing a dfd,
3. a data dictionary,
4. a method of describing the specification.

Data flow diagrams are drawn on the screen at step 92. The procedures for developing DFD'S are discussed above relative to FIG. 3. DFD's are used to translate system concept into a tangible form comprising a network of processes and data elements that is graphic, concise, partitioned and non-redundant. The DFD's advantageously present the requirements in clear and concise manner on the screen so that the analyst and users can better communicate ideas about the software product being developed. The DFD's further allows for a critical analysis of the requirements definition phase as well as providing insight into the design and structure of the software product in later phases of the life-cycle. Continuity is provided between the requirements phase and the design phase since the DFD's and mini-specs generated during the specification (definition) phase would help the design team accomplish the design phase.

Flow balancing is done at step 94. This provides practical means to determine the origin and destination of every data flow. The data flowing into and out of the parent diagram should be equivalent to the data flowing into and out of the child diagram. Conversely, the net input and output of the child's data flows must be equivalent to that of the parent. Maintaining this equivalence is known as balancing the system. The interactive software engineering program offers an automated method of doing this by clicking the "check flow balance" option on the screen. Unbalanced flows are identified by the software and reported to the user for correction.

During requirements definition, consistency checks at step 96 are performed to ensure that the data dictionary and data flow diagrams are constructed in a consistent manner. These checks help maintain the integrity of the system by identifying inconsistencies in the data dictionary and within the structure of the DFD set. The entire leveled set may be checked for inconsistent data flows by clicking the "check consistency" option on the screen. As a result, the equivalency between parent and child is maintained in a computer automated fashion.

The partitioning (or leveling) of the DFD in a top-down manner is performed at step 98 by clicking the computer's mouse on the screen and producing a new screen, as exemplified in FIGS. 4 and 5. The DFD leveling step has been fully discussed in reference to FIGS. 4 and 5. A data dictionary of unique variables is generated during this step. Mini-specs are generated at step 98 from functional primitives when data flow diagrams are partitioned.

The simple mini-spec exemplified in FIG. 7 is created and displayed on screen by the interactive software using an interactive language sensitive mini-spec editor. It demonstrates the ability of structured English to express a functional primitive in a concise manner. Since every functional primitive has a mini-spec, the functional primitive is mapped to the mini-spec by using the number of the functional primitive on the data flow diagram as the prefix for the mini-spec. For the example in FIG. 7, the prefix of the mini-spec (5.4.3) corresponds to the number of the functional primitive. Clearly, a mini-spec provides a good tool for developing software design requirements during the design phase of the live-cycle.

The program size estimate is calculated at step 100. The number of data flows (DF) are an $LOC_n$ predictor metric such that:

$$LOC_n = 29.027 + 3.892 * DF$$

By selecting the "estimate program size using DF" option on the screen, the user may generate an objective estimate of program size during the earliest stages of the software product development. The $LOC_n$ for the final software product size is estimated automatically by the interactive software engineering program for each module defined by a data flow diagram. Subsequently, the size of the entire software product is collectively predicted when the program adds the module sizes.

REQUIREMENTS ANALYSIS

Referring to FIG. 15, the software engineering program expands interactively the data dictionary generated at step 98 by allowing the user to click on a particular data flow and presenting the elements on screen. These elements may then be modified or expanded at step 102 using a language sensitive data dictionary editor.

Steps 104, 106 and 108 are the same as steps 94, 96 and 98, respectively, discussed in FIG. 14.

The program size estimate is calculated at step 110. Note that the data dictionary furnishes the software life-cycle with its first attempt at defining the variables that will be used to implement the system. The final software program size is estimated by the following:

$$LOC_n = -11.434 + 3.072 * DF + 5.843 * DD$$

The above equation demonstrates a further refinement of the $LOC_n$ estimate using both the number of data flows and the number of data elements for a module. By selecting the "estimate program size using DF, DD" option on the screen, the user may generate a second, more accurate, objective estimate of the final software product system size, during the requirements analysis phase of software product development. Using this approach, the $LOC_n$ is again predicted automatically for each module defined by a data flow diagram and offering an expanded data dictionary. Subsequently, the size of the software product system is predicted when the interactive software engineering program adds the module sizes.

The mini-specs are updated at step 112.

At this point, the interactive software for requirements analysis has been defined, and the following information appears on the screen, in a computerized structured specification document:

1. a complete set of leveled data flow diagrams,
2. a data dictionary that includes the definitions of every data store, data flow and data element in the data flow diagrams,
3. mini-specs, in the form of structured English, for each functional primitive,
4. requirements that cannot be specified using any of he previously discussed techniques (an example might include a report layout).

PRELIMINARY DESIGN

Referring to FIG. 16, transform analysis is performed at step 114, wherein the data flow diagrams are transformed into structure charts, as discussed above relative to FIGS. 9 and 10 above. The mechanism for converting a data flow diagram into a structure chart is a very logical and methodical algorithm, capable of being implemented as a software process. It allows different software engineers to arrive at similar design solutions from the same requirements specification.

Flow balancing and structure chart consistency checks are performed at steps 116 and 118. These steps are similar to steps 94 and 96, discussed above.

The structure chart is refined at step 120 and is described in conjunction with FIGS. 9 and 10 above. Refining the structure charts includes adding modules for each afferent and efferent data flow, adding error handling routines, adding initialization and termination routines, and defining the logical and control variables flowing into each module.

At this point, the software engineering program expands the data dictionary interactively by allowing the user to click on a particular data flow and presenting the elements on the screen. The logical and controlled variables may then be modified or expanded using a language sensitive data dictionary editor at step 122.

The process of transform analysis will expand the number of variables defined for each module during structured analysis to include logical and controlled variables. This provides another refinement to the number of unique variables metric, and provides the following equation for each module:

$$LOC_n = -5.729 + 1.942*DF + 12.654LC$$

The above equation demonstrates a further refinement of the $LOC_n$ estimate using both the number of data flows and the number of logical and controlled variables for a module. By selecting the "estimate program size using DF, LC" option on the screen, the user may generate a third, more accurate, objective estimate of final software product size at step 124. Using this approach, the $LOC_n$ is predicted automatically for each module defined by a structure chart and offering an expanded data dictionary. Subsequently, the size of the software product being developed is predicted by the interactive software engineering program adding the module sizes.

DETAILED DESIGN

Referring to FIG. 17, the mini-spec is translated into pseudocode at step 126. At this point, all of the structure charts have been partitioned and all of the input and output variables required by the structure charts have been defined interactively on the host computer system. The mini-spec defined by the interactive software during structure analysis (FIGS. 14 and 15) is translated into a detailed description of the processes partitioned by the structure charts.

The interactive software expands the data dictionary interactively by allowing the user to click on a particular data flow and presenting the elements on the screen. The static variables may then be modified or expanded at step 128 using a language sensitive data dictionary editor.

The data dictionary is updated at step 128 and the flow balance is performed at step 130. Steps 128 and 130 are similar to steps 94 and 96, respectively, discussed above.

At this point, the data dictionary variables have been refined to include all of the static variables. The size of the software product being developed is estimated by the following:

$$LOC_n = 1.583 + 5.429*VARS$$

The above equation demonstrates a further refinement of the $LOC_n$ estimate using the number of variables found within a software module. By selecting the "estimate program size using VARS" option on the screen, the user may generate a forth, more objective estimate of final software system product size at step 134. Using this approach, the $LOC_n$ is again predicted automatically for each module offering an expanded data dictionary. Subsequently, the size of the software system product is again predicted by the interactive software engineering program adding the module sizes.

Translating the mini-specs into a program design language provides the final step in determining the number of unique variables (VARS) in a software module. VARS can then be used to determined the $LOC_n$ for each module in the system, and the sum of the $LOC_n$ for each module in the system can be used to determine the total $LOC_n$ for the entire programming effort.

By having each of the components of the software engineering program implemented through an interactive computer interface, all phases of the software life-cycle could be addressed, including requirements analysis, design, planning, cost estimating, etc. In addition, the impact of changing any one particular factor could be analyzed and the best alternatives could be chosen without a detailed knowledge of each of the interactive software engineering program components.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An interactive computerized tool for estimating the final lines of code of the software product being developed at various phases of the development process using a life cycle model, including a requirements definition phase, requirements analysis phase, preliminary design phase and detailed design phase, said tool comprising:

a) a computer system including an interactive software operating in said computer system;

b) said software comprising the steps of asking the user whether the user is in the requirements definition phase, requirements analysis phase, preliminary design phase, or detailed design phase;

b) if at the requirements definition phase, said software including the steps of drawing data flow diagrams, leveling the data flow diagrams to generate a data dictionary data variables and calculating the final lines of code for the software product being developed from the data flows diagrams;

c) if at the requirements analysis phase, said software including the steps of updating the data dictionary data variables and calculating the final lines of code for the software product being developed from the number of data flow diagrams and the data dictionary;

d) if at the preliminary design phase, said software including the steps of transforming the data flow diagrams into structure charts to generate logic and control variables and calculating the final lines of code for the software product being developed from the data flow diagrams and the number of logic and control variables; and e) if at the detailed design phase, said software including the steps of translating the mini-specs into pseudocode to generate static variables and calculating the final lines of code for the software product being developed from the data dictionary, logic and control variables and static variables.

2. The tool as in claim 1, wherein:

a) the lines of code is calculated at the requirements definition phase from the equation, $$LOC_n = 29.027 + 3.892*DF + e,$$

where $LOC_n$=number of lines of code,
DF=number of data flows between modules,
e=standard error for regression.

3. The tool as in claim 1, wherein:
a) the lines of code is calculated at the requirements analysis phase from the equation, $$LOC_n = -11.434 + 3.072*DF + 5.843*DD + e,$$

where
$LOC_n$=number of lines of code,
DF=number of data flows between modules,
DD=number of unique data elements in the data dictionary,
e=standard error for regression.

4. The tool as in claim 1, wherein:
a) the lines of code is estimated at the preliminary design phase from the equation, $$LOC_n = -5.729 + 1.942*DF + 12.654*LC + e,$$

where
$LOC_n$=number of lines of code,
DF=number of data flows between modules,
DD=number of data dictionary,
LC=the number of logical and control variables,
e=standard error for regression.

5. The tool as in claim 1, wherein:
a) the lines of code at the detailed design phase is calculated from the equation, $$LOC_n = -11.593 + 1.799*DF + 2.51*DD + 8.545*LC + 6.033*SV + e,$$
$$= 1.583 + 5.429*(DD+LC+SV) + e, = 1.583 + 5.429*(VARS) + e,$$

where
$LOC_n$=lines of code,
DF=number of data flows between modules,
DD=number of unique data elements in the data dictionary,
LC=the number of logical and control variables,
SV=the number of static variables,
VARS=the sum of the number of unique variables within a software module,
e=standard error for regression.

6. A software storage disk, comprising:
a) disk;
b) software encoded on said disk;
c) said software being adapted for estimating the final lines of code of the software product being developed at various phases of the development process using a life cycle model, including a requirements definition phase, requirements analysis phase, preliminary design phase and detailed design phase;
d) said software comprising the steps of asking the user whether the user is in the requirements definition phase, requirements analysis phase, preliminary design phase, or detailed design phase;
e) if at the requirements definition phase, said software including the steps of drawing data flow diagrams, leveling the data flow diagrams to generate a data dictionary data variables and calculating the final lines of code for the software product being developed from the data flows diagrams;
f) if at the requirements analysis phase, said software including the steps of updating the data dictionary data variables and calculating the final lines of code for the software product being developed from the number of data flow diagrams and the data dictionary;
g) if at the preliminary design phase, said software including the steps of transforming the data flow diagrams into structure charts to generate logic and control variables and calculating the final lines of code for the software product being developed from the data flow diagrams and the number of logic and control variables; and
h) if at the detailed design phase, said software including the steps of translating the mini-specs into pseudocode to generate static variables and calculating the final lines of code for the software product being developed from the data dictionary, logic and control variables and static variables.

7. The disk as in claim 6, wherein:
a) the lines of code is calculated at the requirements definition phase from the equation, $$LOC_n = 29.027 + 3.892*DF + e,$$

where
$LOC_n$=number of lines of code,
DF=number of data flows between modules,
e=standard error for regression.

8. The disk as in claim 6, wherein:
a) the lines of code is calculated at the requirements analysis phase from the equation, $$LOC_n = -11.434 + 3.072*DF + 5.843*DD + e,$$

where
$LOC_n$=number of lines of code,
DF=number of data flows between modules,
DD=number of unique data elements in the data dictionary,
e=standard error for regression.

9. The disk as in claim 6, wherein:
a) the lines of code is estimated at the preliminary design phase from the equation, $$LOC_n = -5.729 + 1.942*DF + 12.654*LC + e,$$

where
$LOC_n$=number of lines of code,
DF=number of data flows between modules,
DD=number of data dictionary,
LC=the number of logical and control variables,
e=standard error for regression.

10. The disk as in claim 6, wherein:
a) the lines of code at the detailed design phase is calculated from the equation, $$LOC_n = -11.593 + 1.799*DF + 2.51*DD + 8.545*LC + 6.033*SV + e,$$
$$= 1.583 + 5.429*(DD+LC+SV) + e, = 1.583 + 5.429*(VARS) + e,$$

where
$LOC_n$=lines of code,
DF=number of data flows between modules,
DD=number of unique data elements in the data dictionary,
LC=the number of logical and control variables,
SV=the number of static variables,
VARS=the sum of the number of unique variables within a software module,
e=standard error for regression.

* * * * *